Patented June 24, 1952

2,601,252

UNITED STATES PATENT OFFICE 2,601,252

POLYMERIC COMPOSITIONS

Herman A. Bruson, Shaker Heights, Ohio, assignor to Industrial Rayon Corporation, Cleveland, Ohio, a corporation of Delaware No Drawing. Application March 25, 1949,
Serial No. 83,515

13 Claims. (Cl. 18—54)

This invention relates to the preparation of compositions of polymeric materials, and to the production of shaped articles therefrom. More specifically, the invention provides new and useful compositions of acrylonitrile polymers, and shaped articles formed therefrom. Moreover, it provides a method for preparing such shaped articles. The term "polymers" is intended herein also to include copolymers of acrylonitrile with other polymerizable substances.

Very useful polymers have been prepared from acrylonitrile with or without other polymerizable substances, for example, vinyl, vinylidene, isopropenyl and other ethylenic compounds, in which polymers more than 85% by weight is acrylonitrile. These acrylonitrile polymers possess, in many cases, desirable physical and chemical properties including toughness and solvent resistance to common organic solvents such as methyl or ethyl alcohol, acetone, ethyl ether, ethyl acetate, hydrocarbons, chlorinated hydrocarbons, and the like. Because of these properties, it has been considered desirable that such polymeric materials be fashioned into fibers, films, bristles and other shaped articles.

In the production of shaped articles such as fibers or filaments, it is desirable to prepare solutions or gels of the acrylonitrile polymers for wet or dry spinning or for drawing through dies. For this purpose it is important to find a solvent which is capable of readily dissolving acrylonitrile polymers and copolymers. This problem is complicated by the fact that acrylonitrile polymers containing more than 85% acrylonitrile in the polymer molecule are not readily soluble in the ordinary solvents.

It has previously been proposed in U. S. Patent No. 2,167,537 (Tobis) that mixtures of organic solvents such as dioxane, monochlorobenzene, cyclohexanone, etc., may be used as solvents for polyacrylonitrile polymers containing acrylic acid esters. However, the Tobis patent suggests that these solvents are primarily effective only when the percentage of acrylonitrile is below 65%.

It has also been proposed to use concentrated aqueous solutions of inorganic salts such as lithium bromide, zinc chloride, sodium thiocyanate and calcium perchlorate (Rein, U. S. Patent No. 2,140,921; Kropa, U. S. Patent No. 2,356,767), or molten quaternary ammonium salts such as benzyl pyridinium chloride (Rein, U. S. Patent No. 2,117,210), in the preparation of compositions of acrylonitrile polymers. However, these compositions have been found generally unsatisfactory for use in the formation of yarns and films. The former type of solution, upon extrusion into coagulating baths, gives shaped articles that contain large amounts of the inorganic salts of the proposed solvent. The presence of the foreign materials in the resultant polymer-solvent compositions produces discontinuities which cause weakness and brittleness in the shaped articles. The compositions containing the quaternary ammonium salts are dark colored, indicating some decomposition or reaction of the polyacrylonitrile in the presence of the molten salt, and the films or filaments obtained from such solutions are generally extremely brittle, highly colored, and very weak.

It has also been proposed to dissolve polyacrylonitrile and copolymers thereof containing at least 85% by weight of acrylonitrile in a large variety of nitrogen-containing organic solvents as well as in certain sulfur-containing solvents. Among these are, for example, certain N-substituted amides such as dimethyl formamide (Latham, U. S. Patent No. 2,404,714); nitriles such as succinonitrile (Rogers, U. S. Patent No. 2,404,715); N,N-dimethyl-cyanoacetamide (Hansley, U. S. Patent No. 2,404,716); N,N-bis(cyanomethyl)formamide (Merner, U. S. Patent No. 2,404,723); N,N-dimethyl-cyanamide (Rogers, U. S. Patent No. 2,404,725); hydracrylonitrile and glycolonitrile (Charch, U. S. Patent No. 2,404,726); malononitrile and methylene thiocyanate (Houtz, U. S. Patent No. 2,404,727); various sulfones and sulfoxides (Houtz, U. S. Patent No. 2,404,717; 2,404,722); various thiocyanates (Houtz, U. S. Patent No. 2,404,718); various lactams and pyridones (Houtz, U. S. Patent No. 2,404,719); various nitrophenols (Houtz, U. S. Patent No. 2,404,721); and aromatic diamines such as meta-phenylene diamine (Houtz, U. S. Patent No. 2,404,720).

Although many of these nitrogenous and sulfur-containing compounds are good solvents for polyacrylonitrile and acrylonitrile copolymers, they have certain disadvantages when used industrially. For example, N,N-dimethyl formamide solutions of polyacrylonitrile rapidly discolor when heated in air at temperatures above 110° C. and yield stained fibers. Furthermore, since many of these solvents have high boiling points, relatively high temperatures are required to expel the solvent from the filaments during evaporative dry-spinning in a current of heated air, causing discoloration.

It is an object of this invention to prepare solutions, dispersions or gels of acrylonitrile polymers and copolymers containing more than 85% acrylonitrile in the polymer molecule which polymers and copolymers are insoluble or only very slightly soluble (less than 1%) in nitromethane or other nitrohydrocarbons.

It is a further object of this invention to provide a solvent mixture which has a low evaporation temperature so that solutions can be prepared therein of acrylonitrile polymers or copolymers containing more than 85% acrylonitrile, which solutions can be spun into an evaporative atmosphere, e. g. heated air, to rapidly form dry filaments and fibers.

In accordance with the present invention, it has been found that new compositions useful for the production of shaped articles such as, for example, filaments, films, and the like, may be prepared by treating acrylonitrile polymers containing in their polymer molecule more than 85% acrylonitrile with mixtures comprising nitromethane and formamide, the ratio by weight in the mixtures being between about 9 and 0.8 of nitromethane to 1 of formamide. The resulting compositions may range from thin solutions to rigid gels. Such compositions may be transformed into shaped articles by casting, by dry spinning or by wet spinning, e. g., by extruding spinning solutions into suitable coagulating media. Fibers made by such methods may be stretched and heat treated so as to produce oriented fibers having high tenacity, high elastic recovery, low shrinkage, etc.

Nitromethane and formamide individually are not effective solvents for acrylonitrile polymers and copolymers having in excess of 85% acrylonitrile. Attempts to dissolve polyacrylonitrile itself in nitromethane at its boiling point (101° C.) have been unsuccessful. Likewise, formamide at its boiling point (193° C.) does not appreciably dissolve pure polyacrylonitrile, even though N,N-dimethyl formamide is a powerful solvent for polyacrylonitrile at 60° C.

However, in accordance with the present invention, it has been found that mixtures of nitromethane and formamide will dissolve acrylonitrile polymers and copolymers which because of their high acrylonitrile content (more than 85%) are not appreciably soluble in either one of these liquids individually. For example, a sample of pure polyacrylonitrile having an average molecular weight of 60,000 can be boiled with nine times its weight of either nitromethane or formamide individually, and only traces (less than 1%) of the polymer will be dissolved. If, however, the same polymer is gently warmed at a temperature between 60° and 80° C. with nine times its weight of a 1:1 mixture by weight of nitromethane and formamide, it will dissolve completely to form a clear, homogeneous, viscous solution which upon cooling to room temperature forms a rigid translucent gel. Further, it has been found that mixtures of nitromethane and formamide containing proportions as great as seven parts by weight nitromethane to one part by weight formamide, will dissolve acrylonitrile polymers which are not appreciably soluble in nitromethane or formamide separately, and that a wide variety of acrylonitrile copolymers containing more than 85% acrylonitrile can be readily dissolved in other mixtures of nitromethane and formamide, even though they are practically insoluble in either of these liquids taken individually.

Typical copolymers which can be used in the practice of the applicant's invention are those containing more than 85% acrylonitrile with other polymerizable compounds containing the grouping $CH_2=C=$ or $-CH=CH-$, such as vinyl esters, vinyl ethers, and vinyl ketones; acrylic acid and its esters and amide; methacrylic acid and its esters, amide, or nitrile; maleic, itaconic and fumaric acids and their esters, amides or nitriles; allyl alcohol and its esters; styrene, and substituted styrenes, e. g., chloro and dichlorostyrenes; halogenated monoethylenic compounds such as vinyl chloride, vinyl fluoride and vinylidene chloride; isopropenyl acetate, 2-vinylpyridine, N-vinyl carbazole, and the like.

Shaped articles may be formed from solutions of the above-mentioned copolymers by casting, by dry spinning or by wet spinning, e. g., by extruding the spinning solution into suitable coagulating media. Filamentary materials produced by such methods may be oriented to form fibers having high tenacity, high elastic recovery, low shrinkage, etc.

This invention will be more fully described by the following examples, although it is understood that the invention is not intended to be limited by these examples. In these examples "parts" and "percent" of materials is intended to mean parts and percent by weight.

*Example I*

A solution of 95 parts acrylonitrile and 5 parts methacrylonitrile was slowly added to a stirred solution consisting of 400 parts water, 1.3 parts ammonium persulfate and 2.7 parts sodium bisulfite at 55–60° C. in an atmosphere of nitrogen during a period of fifty minutes. The mixture was then stirred and heated at 57–60° C. for four hours longer. A white powdery copolymer was formed which was filtered off, washed and dried at 80° C. The yield of copolymer was 96 parts.

The resulting copolymer was practically insoluble in either boiling nitromethane or boiling formamide, but was readily soluble in a mixture of formamide and nitromethane. 10 parts copolymer was dissolved at 80–90° C. in a mixture of 6 parts formamide and 24 parts nitromethane to give a clear, viscous, homogeneous 25% solution capable of being spun to yield orientable films and filaments.

In a similar manner a solution was prepared by combining 10 parts copolymer, 8.6 parts formamide and 51.4 parts nitromethane and heating at 90° C. to form a clear syrupy solution. The resulting solution was poured upon a glass plate to form a thin film and then heated in an oven at 110° C. for ten minutes. A clear, hard, coherent, slightly yellow film was obtained.

*Example II*

96 parts acrylonitrile was mixed with 4 parts 2-vinylpyridine and the resulting solution slowly added to a stirred solution of 400 parts water, 1.3 parts ammonium persulfate and 2.7 parts sodium bisulfite at 60–62° C. in an atmosphere of nitrogen during a period of one hour. The mixture was then stirred and heated for an additional three hours at 55–60° C. A white powdery copolymer was formed which was filtered off, washed and dried at 75° C. The yield of copolymer was 94 parts.

The resulting copolymer was practically insoluble in either boiling nitromethane or boiling formamide, but was readily soluble in a mixture of nitromethane and formamide. 10 parts copolymer was dissolved in a mixture of 5 parts formamide and 25 parts nitromethane to give a clear, viscous, homogeneous 25% solution capable of yielding orientable fibers and filaments.

Example III

A solution of 95 parts acrylonitrile and 5 parts maleic anhydride was slowly added to a stirred solution consisting of 500 parts water, 5 parts Triton 720 (sulfonated octyl phenoxy ethoxy ethoxy ethanol), 1.3 parts ammonium persulfate and 2.7 parts sodium bisulfite at 58–60° C. in an atmosphere of nitrogen during a period of one hour. The mixture was then stirred and heated at 60° C. for an additional three hours. A white powdery copolymer was formed which was filtered off, washed and dried at 75–80° C. The yield of copolymer was 93 parts.

The resulting copolymer was practically insoluble in either boiling nitromethane or boiling formamide, but was readily soluble in a mixture of nitromethane and formamide. 10 parts copolymer was dissolved at 95° C. in a mixture of 4.3 parts formamide and 25.7 parts nitromethane to give a clear, viscous, homogeneous 25% solution which can readily be spun to yield orientable fibers.

Example IV 97 parts acrylonitrile was mixed with 3 parts dimethylaminoethyl vinyl ether

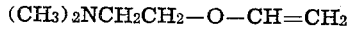

$(CH_3)_2NCH_2CH_2-O-CH=CH_2$ and the resulting solution slowly added to a stirred solution of 680 parts water, 4.6 parts ammonium persulfate and 1.04 parts sodium bisulfite at 60–65° C. in an atmosphere of nitrogen during a period of 45 minutes. The mixture was then stirred and heated at 60–65° C. for an additional 2½ hours. A powdery copolymer was formed which was filtered off, washed and dried at 80° C. to yield 94 parts of the copolymer.

The resulting copolymer was practically insoluble in boiling nitromethane or boiling formamide, but was soluble in a mixture of nitromethane and formamide. 10 parts copolymer was dissolved at 90–95° C. in a mixture of 3.75 parts formamide and 26.25 parts nitromethane to give a clear syrupy 25% solution capable of being spun to yield orientable fibers which accepted acid dyestuffs.

Two parts of this copolymer having a molecular weight of 35,000 was dissolved in a mixture of seven parts nitromethane and one part formamide. The resulting solution, heated to 80° C., was extruded through a 40 hole (0.003 inch diameter) spinneret into a bath of tetraethylene glycol at 100–120° C. The resulting filaments were then passed through a heated copper tube at 120° C. and stretched 800% to yield useful oriented fibers.

In practicing this invention, various mixtures comprising nitromethane and formamide may be employed with advantage to dissolve or gelatinize polyacrylonitrile at about 60–100° C., so long as the ratio by weight is maintained between about 9 and 0.8 of nitromethane to 1 of formamide, or expressed in percent, the formamide being between about 10% and 55% of the nitromethane-formamide content. A quite good solvent mixture for pure polyacrylonitrile having an average molecular weight of from about 20,000 to 200,000 will contain from 15% to 20% formamide and the balance, nitromethane. Solutions thus obtained will vary in viscosity depending upon the temperature and the molecular weight of the polymer. Solutions prepared from polyacrylonitrile of average molecular weight 40,000 to 80,000 will, in general, at 60–80° C. be flowable, pumpable, homogeneous, viscous solutions at concentrations of polymer below 15% solids. Concentrations between 15% and 25% solids will generally be dough-like viscous gels under the same conditions. These gels may be extruded through dies to give bristles and fibers.

Fibers having especially advantageous properties, such as high orientation, high tenacity, high elastic recovery, and low shrinkage, may be prepared from the compositions of this invention by using polyacrylonitrile or acrylonitrile copolymers of vinyl esters, vinyl ethers, and vinyl ketones; acrylic acid and its esters and amide; methacrylic acid and its esters, amide, or nitrile; maleic, itaconic and fumaric acids and their esters, amides or nitriles; allyl alcohol and its esters; styrene, and substituted styrenes, e. g., chloro and dichlorostyrenes; halogenated monoethylenic compounds such as vinyl chloride, vinyl fluoride and vinylidene chloride; isopropenyl acetate, 2-vinylpyridine, N-vinylcarbazole and the like, having more than 85% by weight of acrylonitrile in the polymer molecule.

For various purposes it may be desirable to chemically and physically modify the polymeric compositions of this invention by the presence of other materials. The solvent mixtures of this invention comprising nitromethane and formamide, are also useful in the preparation of mixtures of acrylonitrile polymers with various modifying agents such as other polymers, for example, polyvinyl chloride and polyvinylidene chloride, partial solvents or non-solvents, or mixtures of these, pigments, dyes, plasticizers, stabilizers, spinning agents, incrustation inhibitors, etc.

The acrylonitrile polymers and copolymers may be prepared by any suitable polymerization method, such as, for example, the ammonium or potassium persulfate catalyzed polymerization of monomer or monomers dissolved or emulsified in water. Molecular weights of these polymers and copolymers are preferably within the range of 10,000 and 250,000, or even higher, although polymers having molecular weights between 40,000 and 150,000 may be used with particular advantage in the production of shaped articles. Polymers having a molecular weight of less than 50,000 may be used for such purposes as impregnants, solvent-resistant coatings, etc.

Useful solutions, gels and dispersions may be prepared by heating finely divided acrylonitrile polymer or copolymer in the presence of the solvent mixtures of this invention comprising nitromethane and formamide at temperatures from about 50° C. to about 100° C. In general, the proportion of solvent to polymer can be varied over a wide range to give thin solutions or rigid gels, including compositions which are cohesible in character.

Compositions of this invention are useful in the production of shaped articles such as filaments, films, bristles, sheets, tubes, etc. These compositions are especially advantageous when shaped articles are produced by wet or by dry spinning. The wet spinning may be accomplished by extruding the polymer solution comprising the acrylonitrile polymer or copolymer, formamide and nitromethane into non-aqueous coagulating baths comprising glycols such as, for example, ethylene glycol, propylene glycol, 2,3-butylene glycol, 1,3-isohexylene glycol, diethylene glycol, triethylene glycol, tetraethylene glycol, polyethylene glycol, dipropylene glycol, tripropylene glycol, etc.

The dry spinning of the aforementioned polymer solutions in the solvent mixtures of this invention can easily be accomplished by extruding into an evaporative atmosphere, such as a current of heated air, at 80–130° C. In addition, films, and sheets, as well as other molded articles, may be cast from such solutions and the solvent removed by evaporation.

The resulting formed articles, especially fibers, may then be stretched up to 600–1000% or more and thereafter heat treated in the stretched form at temperatures of 100–180° C. This stretching may, if desired, be accomplished in secondary baths containing materials similar to those suitable for use as the coagulating baths of this invention.

Fibers obtained in accordance with the invention can be stretched to form oriented structures of high tenacity and high elastic recovery. These stretched articles exhibit characteristic X-ray patterns showing orientation along the fiber axis. Yarns made from these fibers may be used in the manufacture of hosiery and, because of their heat-resistance, may also be fashioned into more general, all-purpose fabrics such as for blouses, suits, skirts, etc.

I claim:

1. A composition comprising a polymer of acrylonitrile containing in the polymer molecule more than 85% by weight of acrylonitrile and as a solvent therefor a mixture comprising nitromethane and formamide, the ratio by weight in said mixture being between about 9 and 0.8 of nitromethane to 1 of formamide.

2. A composition comprising polyacrylonitrile and as a solvent therefor a mixture comprising nitromethane and formamide, the ratio by weight being between about 9 and 0.8 of nitromethane to 1 of formamide.

3. A composition comprising a polymer of acrylonitrile containing in the polymer molecule more than 85% by weight of acrylonitrile dissolved in a mixture comprising nitromethane and formamide, the ratio by weight in said mixture being between about 9 and 0.8 of nitromethane to 1 of formamide, said polymer having a molecular weight between 10,000 and 250,000.

4. A composition comprising a polymer of acrylonitrile containing in the polymer molecule more than 85% by weight of acrylonitrile dissolved in a mixture comprising nitromethane and formamide, the ratio by weight in said mixture being between about 9 and 0.8 of nitromethane to 1 of formamide, said polymer having a molecular weight between 40,000 and 150,000.

5. A composition comprising polyacrylonitrile dissolved in a mixture comprising nitromethane and formamide, the ratio by weight in said mixture being between about 9 and 0.8 of nitromethane to 1 of formamide, said polymer having a molecular weight between 10,000 and 250,000.

6. A composition comprising polyacrylonitrile dissolved in a mixture comprising nitromethane and formamide, the ratio by weight in said mixture being between about 9 and 0.8 of nitromethane to 1 of formamide, said polymer having a molecular weight between 40,000 and 150,000.

7. The method which comprises forming a shaped article by extruding a composition comprising nitromethane, formamide and a polymer of acrylonitrile containing in the polymer molecule more than 85% by weight of acrylonitrile; the ratio by weight in said composition being between about 9 and 0.8 of nitromethane to 1 of formamide.

8. The method which comprises forming a shaped article by extruding into an evaporative atmosphere, a composition comprising nitromethane, formamide and a polymer of acrylonitrile containing in the polymer molecule more than 85% by weight of acrylonitrile; the ratio by weight in said composition being between about 9 and 0.8 of nitromethane to 1 of formamide.

9. The method which comprises forming a shaped article having molecular orientation by extruding into an evaporative atmosphere, a composition comprising nitromethane, formamide and a polymer of acrylonitrile containing in the polymer molecule more than 85% by weight of acrylonitrile and orienting the resulting product; the ratio by weight in said composition being between about 9 and 0.8 of nitromethane to 1 of formamide.

10. The method which comprises forming a fiber having molecular orientation by extruding into an evaporative atmosphere, a composition comprising nitromethane, formamide and a polymer of acrylonitrile containing in the polymer molecule more than 85% by weight of acrylonitrile, orienting the resulting product and heat treating the oriented fiber; the ratio by weight in said composition being between about 9 and 0.8 of nitromethane to 1 of formamide.

11. The method which comprises forming a shaped article by extruding into a coagulating bath, a composition comprising nitromethane, formamide and a polymer of acrylonitrile containing in the polymer molecule more than 85% by weight of acrylonitrile, said coagulating bath comprising a glycol of the group consisting of ethylene glycol, propylene glycol, 2,3-butylene glycol, 1,3-isohexylene glycol, diethylene glycol, triethylene glycol, tetraethylene glycol, polyethylene glycol, dipropylene glycol, and tripropylene glycol; the ratio by weight in said composition being between about 9 and 0.8 of nitromethane to 1 of formamide.

12. The method which comprises forming a shaped article having molecular orientation by extruding into a coagulating bath, a composition comprising nitromethane, formamide and a polymer of acrylonitrile containing in the polymer molecule more than 85% by weight of acrylonitrile, and orienting the resulting product, said coagulating bath comprising a glycol of the group consisting of ethylene glycol, propylene glycol, 2,3-butylene glycol, 1,3-isohexylene glycol, diethylene glycol, triethylene glycol, tetraethylene glycol, polyethylene glycol, dipropylene glycol, and tripropylene glycol; the ratio by weight in said composition being between about 9 and 0.8 of nitromethane to 1 of formamide.

13. The method which comprises forming a fiber having a molecular orientation by extruding into a coagulating bath, a composition comprising nitromethane, formamide and a polymer of acrylonitrile containing in the polymer molecule more than 85% by weight of acrylonitrile, orienting the resulting product and heat treating the oriented fiber, said coagulating bath comprising a glycol of the group consisting of ethylene glycol, propylene glycol, 2,3-butylene glycol, 1,3-isohexylene glycol, diethylene glycol, triethylene glycol, tetraethylene glycol, polyethylene glycol, dipropylene glycol, and tripropylene glycol; the ratio by weight in said composition being between about 9 and 0.8 of nitromethane to 1 of formamide.

HERMAN A. BRUSON.

REFERENCES CITED

The following references are of record in the file of this patent:

UNITED STATES PATENTS

| Number | Name | Date |
| --- | --- | --- |
| 2,417,293 | D'Alelio | Mar. 11, 1947 |
| 2,426,719 | Watkins | Sept. 2, 1947 |
| 2,426,728 | D'Alelio | Sept. 2, 1947 |